United States Patent [19]
Hockstetter

[11] 3,829,756
[45] Aug. 13, 1974

[54] POWER CONTROL APPARATUS FOR DIRECT-CURRENT LINES

[75] Inventor: Werner Hockstetter, Erlangen, Germany

[73] Assignee: Siemens Aktiengesellschaft, Munich, Germany

[22] Filed: Jan. 26, 1973

[21] Appl. No.: 326,772

[30] Foreign Application Priority Data
Jan. 29, 1972 Germany.......................... 2204229

[52] U.S. Cl.......................... 321/4, 321/13, 321/40
[51] Int. Cl. ............................................ H02m 1/18
[58] Field of Search ............ 321/2, 4, 13, 27 R, 38, 321/40; 307/82

[56] References Cited
UNITED STATES PATENTS

| | | | |
|---|---|---|---|
| 3,470,442 | 9/1969 | Ainsworth................ | 321/2 |
| 3,487,286 | 12/1969 | Persson.................... | 321/2 |
| 3,543,129 | 11/1970 | Boksjo..................... | 321/2 |
| 3,644,820 | 2/1972 | Ainsworth................ | 321/2 |

Primary Examiner—William H. Beha, Jr.
Attorney, Agent, or Firm—Kenyon & Kenyon Reilly Carr & Chapin

[57] ABSTRACT

A power control apparatus for controlling the power transmitted over a direct-current line connected between alternating-current lines is disclosed. The direct-current line is connected to the alternating-current lines by a converter and inverter respectively. The power control apparatus includes a converter firing unit connected to the converter, a converter current controller connected to the converter firing unit, and a power regulator connected to the converter current controller for supplying the same with a current reference value. An inverter firing unit is connected to the inverter and a voltage controller and an inverter current controller are provided for setting respective voltages on the direct-current line. One of these voltages is smaller than the other at a given time. A connection circuit connects the last-two mentioned controllers to the inverter firing unit so as to cause the controller corresponding to the one voltage to act upon the inverter firing unit at the given time. The inverter current controller has an input for receiving a current reference value smaller than the current reference value supplied to the converter current controller. The inverter current controller is configured to stabilize the current in the direct-current line to the current reference value supplied to the inverter current controller in a predetermined time interval. A remote transmission arrangement is connected between the power regulator and the inverter current controller for adjusting the current reference value supplied to the inverter current controller in response to a change in the power after the time interval has elapsed.

2 Claims, 1 Drawing Figure

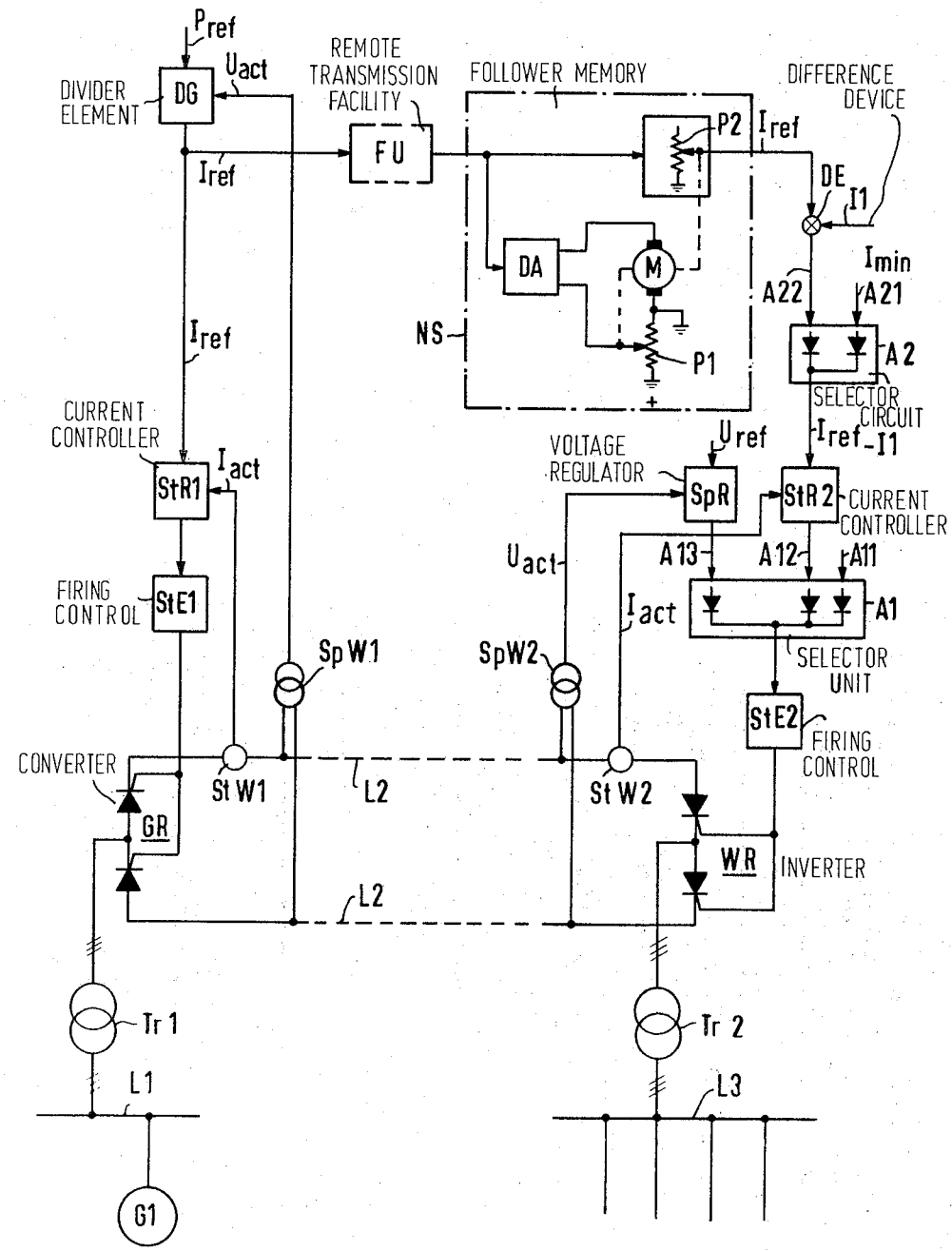

POWER CONTROL APPARATUS FOR DIRECT-CURRENT LINES

BACKGROUND OF THE INVENTION

More and more direct-current lines are used particularly for transmitting electric energy over long distances. These direct-current lines are connected to a converter at one end and to an inverter at the other end, both being single-phase or three-phase systems.

In order to avoid unnecessary harmonics and to reduce the reactive power that must be made available, such direct-current lines are operated on the inverter side with the highest possible utilization of the converter components, that is, with the highest possible voltage.

To prevent the discontinuance of transmission of current when a reduction of direct-current voltage occurs on the converter end of the dc line with a dip of the voltage of the supplying alternating current network, a current controller is connected ahead of the inverter. The current controller ahead of the inverter has a reference value below the current reference value for the current controller of the converter. This achieves the result that in the event of a reduction of the voltage in the feeding system only a slight reduction of the current takes place on the dc line. If, however, the transmitted power is suddenly to be reduced substantially for any reason, or set to the value zero, this adjustment would be delayed by the current controller of the inverter unless the reference value of the latter is also regulated down quickly. In order to assure this, high-speed remote-transmission facilities for transmitting the desired current value are used, which in such a case prevent the current control for the inverter from becoming effective.

SUMMARY OF THE INVENTION

It is an object of the invention to eliminate the high-speed remote-transmission facility of the type referred to above in power control apparatus for a direct-current line while at the same time assure that sudden reductions of the power can be made.

The power control apparatus of the invention controls the power transmitted over a direct-current line connected between alternating-current lines. The direct-current line is connected to the alternating-current lines by a converter and inverter respectively. According to a features of the invention, the control apparatus includes a converter firing unit connected to the converter. A converter current controller is connected to the firing unit, and a power regulator is connected to the current controller for supplying the same with a current reference value. An inverter firing unit is connected to the inverter. A voltage controller and a second current controller are provided for setting respective voltages on the direct-current line. One of the respective voltages is smaller than the other of these voltages at a given time. Connection means connect the last-two mentioned controllers to the inverter firing unit so as to cause the controller corresponding to the one voltage to act upon the inverter firing unit at the given time. The second current controller has an input for receiving a current reference value smaller than the current reference value supplied to the first current controller. The inverter current controller is configured to stabilize the current in the direct-current line to the current reference value supplied to the inverter current controller in a predetermined time interval. A remote transmission arrangement connected between the power regulator and the inverter current controller adjusts the current reference value supplied to the inverter current controller in response to a change in the power after the time interval has elapsed.

According to a further feature of the invention, the remote transmission arrangement includes a remote transmission facility for transmitting a quantity proportional to the current reference value supplied to the converter current controller, and a follower memory having an input connected to the transmission facility and an output electrically connected to the input of the inverter current controller for adjusting the current reference value supplied thereto in response to changes to the current reference value supplied to the converter current controller. The follower memory includes means for maintaining the output thereof in the event of a malfunction in the remote transmission facility.

Although the invention is illustrated and described herein as a power control apparatus for direct-current lines, it is nevertheless not intended to be limited to the details shown, since various modifications may be made therein within the scope and the range of the claims. The invention, however, together with additional object and advantages will be best understood from the following description and in connection with the accompanying drawings.

BRIEF DESCRIPTION OF THE DRAWINGS

The drawing is a block diagram of the power control apparatus according to the invention. The power control apparatus is shown for controlling the power transmitted on a direct-current line from an alternating-current source to an alternating-current load.

DESCRIPTION OF THE PREFERRED EMBODIMENTS OF THE INVENTION

A generator G1 feeds a converter GR via a line L1 and a transformer Tr1. To the dc terminals of this converter is connected a dc line L2, the second end of which is brought to the dc terminals of the inverter WR. The ac terminals of the inverter WR are brought to a line L3 via a transformer Tr2. Power is here transmitted from the converter GR to the inverter WR. The reference value for the power $P_{ref}$ is entered into a divider element DG. To the divider element is fed further the actual voltage value $U_{act}$ which is taken from a voltage transformer SpW1. The primary winding of this voltage transformer SpW1 is connected to the dc line L2.

In the divider element DG, the quotient of the desired power value $P_{ref}$ and the actual voltage value $U_{act}$ is formed. The desired current value $I_{ref}$ therefore appears at the output of the divider element DG. $I_{ref}$ is fed on the one hand into a remote transmission facility FU and, on the other hand, to the reference input of a current controller StR1. The actual value $I_{act}$ is taken from the secondary winding of a current transformer StW1 and is fed to the current controller StR1. The output of the current controller StR1 is connected to the firing control device StE1 for the converter GR, which makes available the firing pulses for the rectifying components of the converter GR.

The inverter WR is connected on the control side to a firing control unit StE2, the input of which is connected to a selected unit A1. The basic circuit of the selector unit A1 consists of parallel diodes, so that always the highest voltage at one of the three inputs becomes effective for the firing control unit StE2. A voltage is applied to the input A11 of the selector unit A1 which assures that the control angle at the control unit StE2 does not fall below a predetermined minimum value. The input A12 is connected with the output of a current controller StR2 which receives the actual value $I_{act}$ from a current transformer StW2. The input A13 is connected to the output of a voltage regulator SpR. The actual value $U_{act}$ of the voltage is taken from a voltage transformer SpW2, and the reference value $U_{ref}$ is fixed and predetermined. A reference value $I_{ref}$ −I1 is fed to the current controller StR2 via a selector circuit A2, if this value exceeds a minimum value $I_{min}$. For this purpose, a voltage is applied to the input A21 of the selected unit A2, which assures that the current controller StR2 receives a minimum reference value which is above a value at which the controlled components of the inverter WR and the converter GR fail to fire. To the second input A22 of the selector unit A2, a difference device DE is connected, to which is fed, on the one hand, a quantity proportional to the current I1 and, on the other hand, the output of a follower memory NS. On the input side, this follower memory NS is connected to the remote transmission facility FU. The follower memory NS consists essentially of a digital-to-analog converter DA, which is followed, for example, by a series circuit of a motor M and the part of the potentiometer P1 situated between the slider and a fixed point. The slider of this potentiometer P1 is moved, together with the slider of a further potentiometer P2, by the motor. The potentiometer P2 is also connected between positive potential and ground. The result of a change in the output voltage of the digital-to-analog converter DA is therefore that the motor rotates so far that after a certain displacement of the taps of the potentiometers P1 and P2 the voltage between the tap of the potentiometer P1 and ground is equal to the output voltage of unit DA. However, any other known follower memory configuration can be used in place of this follower memory. Suitable examples of devices which may be utilized as divider element DG, remote transmission facility FU, and current controller STR1 can be found in "Untersuchung von Schutz - und Regelungsproblemen in der Modellanlage Rheinau" by V. Foerst, G. Heyner, K. Kanngiesser and M. Becker, ETZ-A Vol. 89 (1968) No. 9, pp. 213 −218, and "Die Fernwirktechnik Im Dienste Der Elektrizitats-Versorgung" by W. Henning, pp. 125–129.

With this arrangement, the following function in normal operation is obtained: the current in the dc line L2 is adjusted by the current controller StR1 as a function of the current reference value $I_{ref}$, which is determined from the desired value of the power $P_{ref}$. The output voltage of the voltage regulator SpR is larger than the output voltage of the current controller StR2 and larger than the voltage at the input A11 of the selector unit A1, so that the inverter WR is controlled for constant voltage $U_{act}$. In the case that the desired value of the power $P_{ref}$ is suddenly reduced, a lower current reference value $I_{ref}$ is set into the current controller StR1. The control angle of the converter GR is thus increased, so that the current in the dc line L2 declines rapidly. Now, because of the lower actual value of the current in the dc line L2, the output of the current controller StR2 becomes more positive, so that the firing angle of the inverter (counted from the control angle 180°) becomes larger and thus reduces the voltage on the dc line L2, in order to again match in this manner the reduced actual value of the current to the referenced value $I_{ref}$ − I1, which up to now has remained constant.

Because with the invention the transmission time of the remote transmission facility FU, including the time for the adjustment of the follower memory NS, is substantially longer than the stabilization time of the current controller StR2, the reference value of the current controller StR2 is at first retained. The consequence of this is that because of the continued flow of the current in the dc line L2, the current controller StR1 continuously reduces the firing angle of the converter GR. Because of the decrease of the denominator $U_{act}$, the dropping of the voltage on the dc line L2 has the effect in the divider element DG that a larger reference value $I_{ref}$ for the current appears at the output of the divider element DG. When the voltage on the dc line L2 has dropped to the point that the current reference value at the output of the divider element DG has reached the value which is preset by the current controller StR2 on the inverter side, the compensation process is completed. The pre-set power is therefore transmitted over the dc line L2 with decreased voltage, while the current in the dc line L2 is reduced only slightly. If after the completion of this process the remote transmission facility FU becomes effective, the dc voltage of this dc line is slowly increased again, while the current in the dc line is decreased.

In contrast to a power control arrangement with a high-speed remote transmission facility for the current reference value or with simultaneous feed-in of a desired-power value into both ends of a dc line, the diminished power value is therefore not achieved by a reduction of the current, but initially through the fact that the voltage on the dc line is reduced to the extent required. This configuration of the power control arrangement thus makes it possible to save considerable expense for a high-speed remote transmission facility; it is furthermore not necessary to provide safety devices for a possible failure of the remote transmission facility, as the follower memory NS retains its previous value without making the power control ineffective thereby.

A particularly good advantage results from the additionally provided input A21 of the selector unit A2, which assures that, independently of the determined reference value $I_{ref}$, a minimum current is maintained, which is above the value of current which will no longer cause the controlled components of the converter and inverter to conduct. In starting up the line, this provides assurance without special measures that the current in the transmission line initially reaches a minimum value which assures proper operation of the converter and the inverter, and that only then the voltage on the dc line L2 increases. Thereby, the power can be increased from practically zero by slowly raising the dc voltage, so that the transmitted power can be matched gradually to the instantaneous capacity of the power generating plant.

What is claimed is:

1. A power control apparatus for controlling the power transmitted over a direct-current line connected between alternating-current lines, the direct-current line being connected to the alternating-current lines by a converter and inverter respectively, comprising a converter firing unit connected to the converter, a converter current controller connected to said converter firing unit, and a power regulator connected to said converter current controller for supplying the same with a current reference value; an inverter firing unit connected to the inverter, a voltage controller and an inverter current controller for setting respective voltages on the direct-current line, one of said respective voltages being smaller than the other one of said respective voltages at a given time, and connection means for connecting said last-two mentioned controllers to said inverter firing unit so as to cause the controller corresponding to said one voltage to act upon said inverter firing unit at said given time, said inverter current controller having an input for receiving a current reference value smaller than said current reference value supplied to said converter current controller, said inverter current controller being configured to stabilize the current in the direct-current line to said current reference value supplied to said inverter current controller in a predetermined time interval; and a remote transmission arrangement connected between said power regulator and said inverter current controller for adjusting the current reference value supplied to said inverter current controller in response to a change in the power after said time interval has elapsed, said remote transmission arrangement including a remote transmission facility for transmitting a quantity proportional to the current reference value supplied to said converter current controller; and a follower memory having an input connected to said transmission facility and an output electrically connected to said input of said inverter current controller for adjusting said current reference value supplied thereto in response to changes to said current reference value supplied to said converter current controller, said follower memory including means for maintaining the output thereof in the event of a malfunction in said remote transmission facility.

2. The power control apparatus of claim 1, said inverter current controller including means for preventing said current reference value supplied thereto from dropping below a value which will cause said converter and said inverter to cease conduction.

* * * * *